Sept. 12, 1939.    B. B. MACHAT    2,172,478
TOOTH EXTRACTING IMPLEMENT
Filed Jan. 19, 1938

INVENTOR.
Bertram B. Machat
BY Fred Francis Weiss his ATTORNEY

Patented Sept. 12, 1939

2,172,478

UNITED STATES PATENT OFFICE 2,172,478

TOOTH-EXTRACTING IMPLEMENT

Bertram B. Machat, Brooklyn, N. Y.

Application January 19, 1938, Serial No. 185,638

1 Claim. (Cl. 32—61)

This invention comprises a simple, manually manipulated implement by means of which teeth may be quickly and easily extracted.

An object of the invention is to provide an implement of this type designed to lift a tooth or tooth root to be extracted from its socket or bony crib by application of a lifting force thereto in a vertical direction, thereby eliminating the necessity for using forceps, wedges and other implements commonly employed for this purpose.

A further object of the invention is to provide an implement of this type so designed that teeth or teeth roots may be readily removed even though they be in a crowded position unduly embedded, impacted, or otherwise inaccessible.

A further object of the invention is to provide an implement of this type which is so constructed and employed as to minimize any chances of injury to the patient while permitting the use thereof in a very simple manner.

These and other objects, as will appear from the following disclosure are secured by means of this invention.

This invention resides substantially in the combination, construction, arrangement and relative location of parts, all in accordance with the following description when taken in connection with the attached drawing.

In the accompanying drawing.

Figure 1:
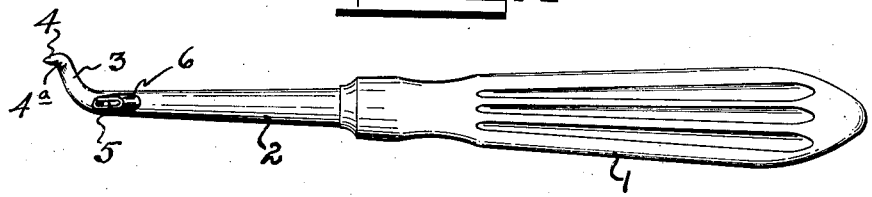
Figure 1 is a side elevational view of the implement.
Figure 2:
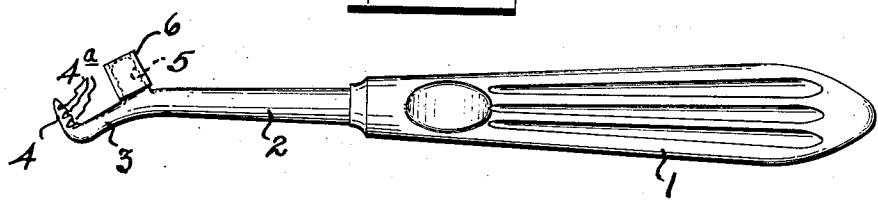
Figure 2 is a top plan view thereof.

As illustrated the implement includes a handle 1 having a stem 2, both of which may be of any suitable cross-sectional form, length and size for the intended uses. These parts may be, and preferably are constructed of any suitable metal. The stem or shaft 2 is illustrated as being of circular cross-section and tapering towards a point at its free end. Towards the free end of the shaft it is offset to the left, as shown in Figure 2 at 3, in the case of what would be termed a righthand implement and the offset portion 3 is also curved downwardly, as is clear from Figure 3. At this point it may be noted that for use on both sides of the mouth a righthand and a lefthand implement is desirable. Those skilled in the art will readily appreciate that structurally both implements are the same, but are formed so as to adapt them to use on opposite sides of the mouth.

The terminal end of the offset portion 3, as shown at 4, is then bent at substantially a right angle to the offset portion and in a direction opposed to the offset as shown in Figure 2. The inner surface of the pointed right angle end 4 is roughened as shown at 4a for a purpose which will become apparent later.

Back of the terminal end 4 and adjacent the region of lateral offsetting is a spur 5 which projects in the same direction as the pointed end 4 and lies more or less parallel thereto. This spur is preferably flat, at least at the bottom face thereof, and has applied thereto a resilient protective casing 6 in the form of a short length of rubber tubing to provide a protective cushion, as will be apparent from Figure 3.

Figure 3:
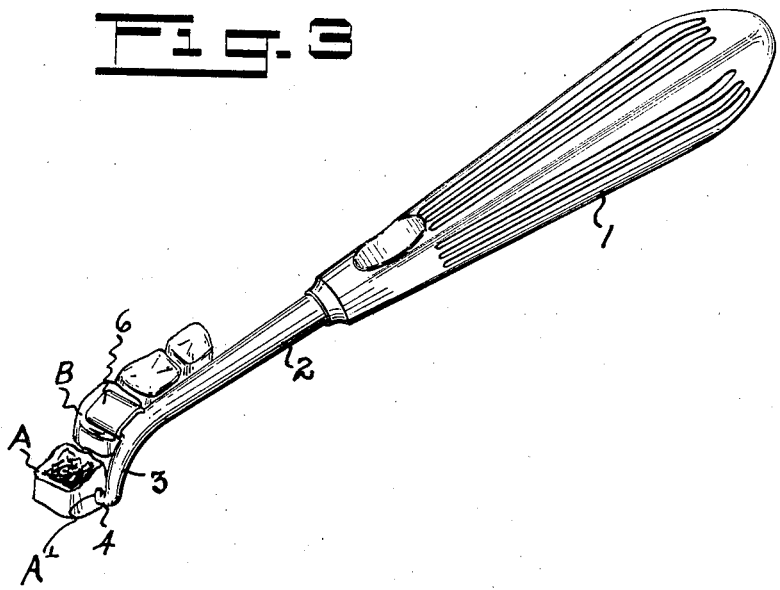
Figure 3 is a perspective view diagrammatically illustrating several teeth and showing the manner in which the implement is positioned for the extraction of teeth.

The method of applying and using the implement will now be explained in connection with Figure 3. At A is illustrated a tooth to be removed. A horizontal hole A' is drilled in the tooth at the enamel line from the mesio-buccal side toward the linguo-distal side for a distance of about one quarter inch. By way of example, this hole is preferably made with a No. 10 gauge drill in order that the pointed end 4 may fit snugly therein, this end being proportioned to accomplish this. The end 4 is preferably about one quarter inch long so that it projects into the hole substantially to the bottom thereof. The pointed end 4 of the implement is then inserted in the hole A' and the spur 5 with its protective covering 6 is rested upon the biting surface of the adjacent sound tooth B. The handle 1 is then depressed with the necessary force, which is relatively small in view of the relative lever lengths on opposite sides of the fulcrum provided by the spur 5, with the result that the tooth A is instantly lifted upwardly. It will be seen that the roughened surface 4a of the pointed end 4 minimizes the chance of its slipping out of the hole in the tooth.

It will be apparent to those skilled in the art that the downward pressure on the biting surface of the sound tooth B will do no injury to it, whereas the use of wedges, or the application of lateral forces to an impacted tooth being extracted are liable to loosen the adjacent sound tooth.

As those skilled in the art will readily appreciate before the hole A' is drilled the tissues overlying the biting and buccal surfaces of the crown of the tooth to be extracted are removed, in accordance with the usual practice. It is now apparent that this implement is particularly effective in the removal of crowded, embedded, impacted and otherwise inaccessible teeth and roots, without danger of injury to or the loosening of adjacent sound teeth. Furthermore, this implement is effective in cases where it is frequently very difficult, if not impossible, to employ extracting forceps. Furthermore, the removal is accomplished without danger of injury to the patient such as might occur by the slipping of forceps when considerable pressure is applied thereto, and without danger of crushing the tooth as sometimes happens when forceps are employed, necessitating a tedious and painful extraction of the tooth bit by bit.

From the above description it will be apparent to those skilled in the art that this invention as illustrated by the specific embodiment shown is capable of incorporation in other physical forms. I do not, therefore, desire to be strictly limited to the disclosure as given for purposes of illustration, but rather to the scope of the claim granted me.

What I seek to secure by United States Letters Patent is:

A dental extracting implement of the type described including a handle having a shaft, the end of the shaft being offset to the longitudinal axis of the shaft and terminating in a portion extending at right angles thereto, said portion having a roughened surface and adapted to fit within a hole drilled in the side of the tooth to be extracted and a fixed spur mounted on said shaft at right angles to its longitudinal axis closely adjacent and parallel to said portion and on the same side of the longitudinal axis of said shaft, said spur being adapted to act as a fulcrum.

BERTRAM B. MACHAT.